United States Patent [19]
Takeuchi et al.

[11] Patent Number: 5,220,166
[45] Date of Patent: Jun. 15, 1993

[54] INFORMATION READING METHOD

[75] Inventors: Nobuyoshi Takeuchi; Yuzo Ishikawa; Kaori Kanesaka, all of Tokyo, Japan

[73] Assignee: Nemoto & Co., Ltd., Tokyo, Japan

[21] Appl. No.: 756,552

[22] Filed: Sep. 9, 1991

[51] Int. Cl.$^5$ .................... G06K 7/10; G06K 19/06
[52] U.S. Cl. .................... 250/271; 235/491
[58] Field of Search ........... 250/271; 235/491, 468, 235/454, 462, 470

[56] References Cited

U.S. PATENT DOCUMENTS

| | | | |
|---|---|---|---|
| 3,566,120 | 2/1971 | Lane, Jr. | 250/271 |
| 3,946,203 | 3/1976 | Hecht et al. | 235/491 |
| 4,202,491 | 5/1980 | Suzuki | 250/271 X |

FOREIGN PATENT DOCUMENTS

| | | | |
|---|---|---|---|
| 2318716 | 10/1974 | Fed. Rep. of Germany | 250/271 |
| 54-33634 | 3/1979 | Japan | 250/271 |

*Primary Examiner*—Constantine Hannaher
*Assistant Examiner*—Edward J. Glick
*Attorney, Agent, or Firm*—Longacre & White

[57] ABSTRACT

An information reading method includes the steps of irradiating a phosphor activated by neodymium and ytterbium ions with exciting light of a wavelength between 500 nm and 780 nm that can excite the neodymium ions, and reading the information by receiving the light emitted from the phosphor with a photodetector designed to detect light with wavelengths between 840 m and 1100 nm. Consequently, the information recorded using the phosphor activated by neodymium and ytterbium ions can be read with a high performance without using a filter for cutting the exciting light.

13 Claims, 4 Drawing Sheets

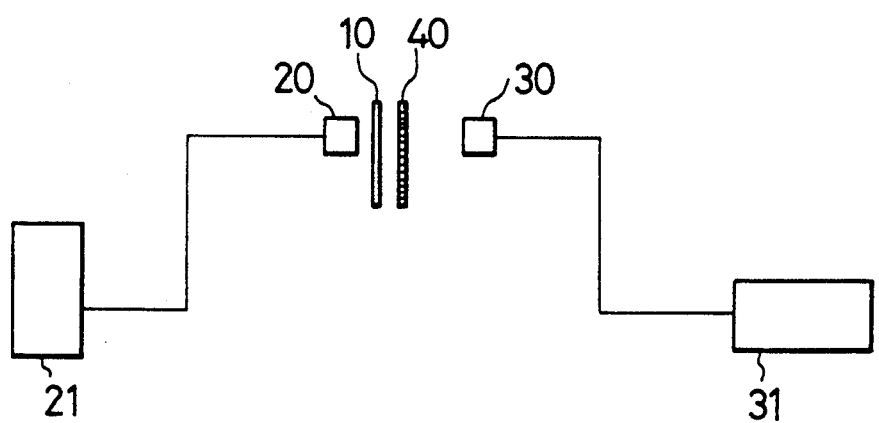
F I G. 3

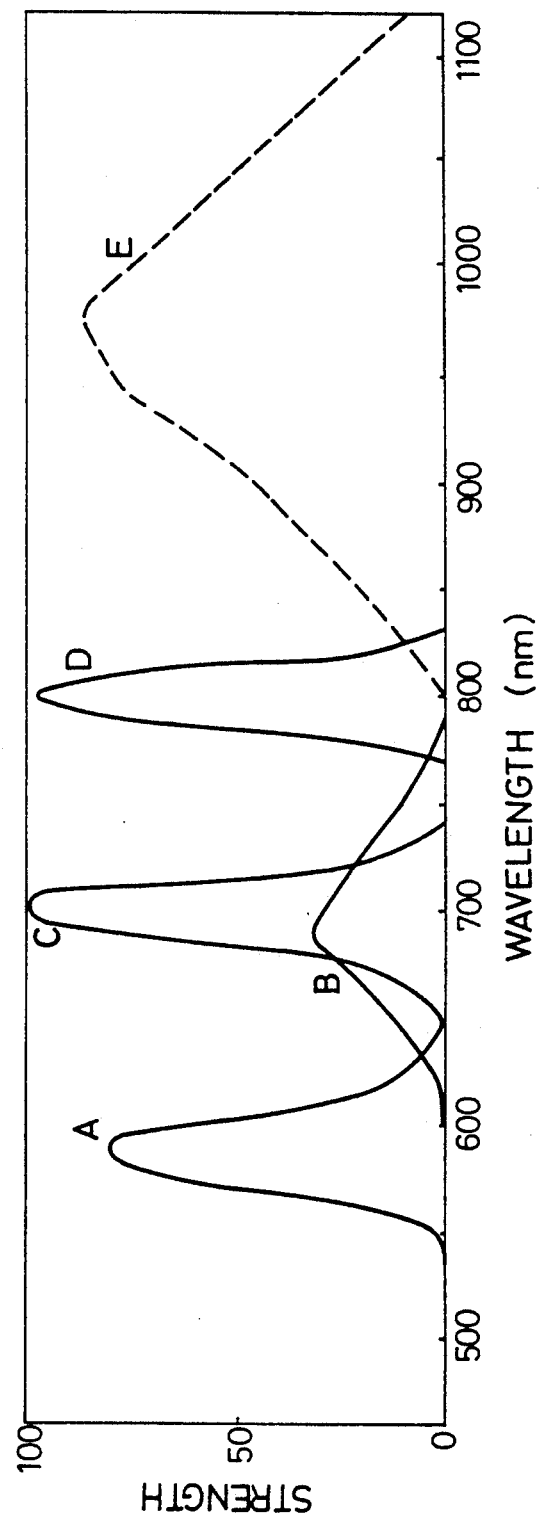

INFORMATION READING METHOD

BACKGROUND OF THE INVENTION

The present invention relates to an information reading method, and more particularly, to a method of optically reading information, such as characters, digits, patterns or symbols. More particularly, the present invention pertains to a method of reading information recorded using a phosphor capable of emitting light in the infrared wavelength region of the spectrum when excited by suitable light.

Optical information reading methods are known in which information, such as characters, digits, patterns or symbols, is recorded using an ink which emits fluorescence and in which the recorded information is read by observing the light emitted from the ink when the ink is excited by adequate light.

Such conventional information reading methods are disclosed in, for example, Japanese Patent Laid-Open No. 33634/1979.

In this information reading method, information recorded using a phosphor which is activated to a predetermined medium by neodymium and ytterbium ions is excited by a GaAlAs light-emitting diode designed to emit light with the peak wavelength of 800 nm, and the light emitted from the stimulated phosphor is read by a photodetector designed to detect light with wavelengths in the range between 900 nm and 1100 nm.

However, in such a conventional information reading method, when the phosphor is excited by light with a wavelength near 800 nm, the photodetector detects that exciting light as well as the light emitted from the phosphor. Therefore, a filter made of, for example, InP polycrystal having a thickness of 0.5 mm must be employed so as to cut out light of a wavelength near 800 nm, so the device using this method is expensive and has a complicated structure.

SUMMARY OF THE INVENTION

Accordingly, an object of the present invention is to provide a method of reading information using a phosphor activated by neodymium and ytterbium ions without using the above-described filter, it is possible to apply to a device which is low cost and compact.

In the information reading method according to the present invention, a phosphor activated by neodymium and ytterbium ions is illuminated by exciting light with a wavelength between 500 nm and 780 nm to stimulate the neodymium ions, and the light emitted from the excited phosphor is detected by a photodetector designed to detect light with wavelengths between 840 nm and 1100 nm as the information.

BRIEF DESCRIPTION OF THE DRAWINGS

FIG. 3 shows the concept of an information reading apparatus which can carry out the present invention; and FIG. 4 is a graph showing the wavelengths of the lights emitted from light-emitting elements and the spectral-sensitivity characteristics of a photodetector employed in examples.

DETAILED DESCRIPTION OF THE INVENTION

In the patent disclosed in Japanese Patent Laid-Open No. 33634/1979, the present inventors took notice of the fact that the wavelength of the exciting light is close to the spectrum of the light detected by the light receiving device, and made various examinations on the new spectrum of the light for exciting the information recording phosphor and suitability between the exciting light and the photodetector for reading information. The present inventors discovered that the phosphor activated by neodymium and ytterbium ions can be excited by light with a wavelength between 500 nm and 780 nm which are shorter than 800 nm described in Japanese Patent Laid-Open No. 33634/1979.

Figure 1:
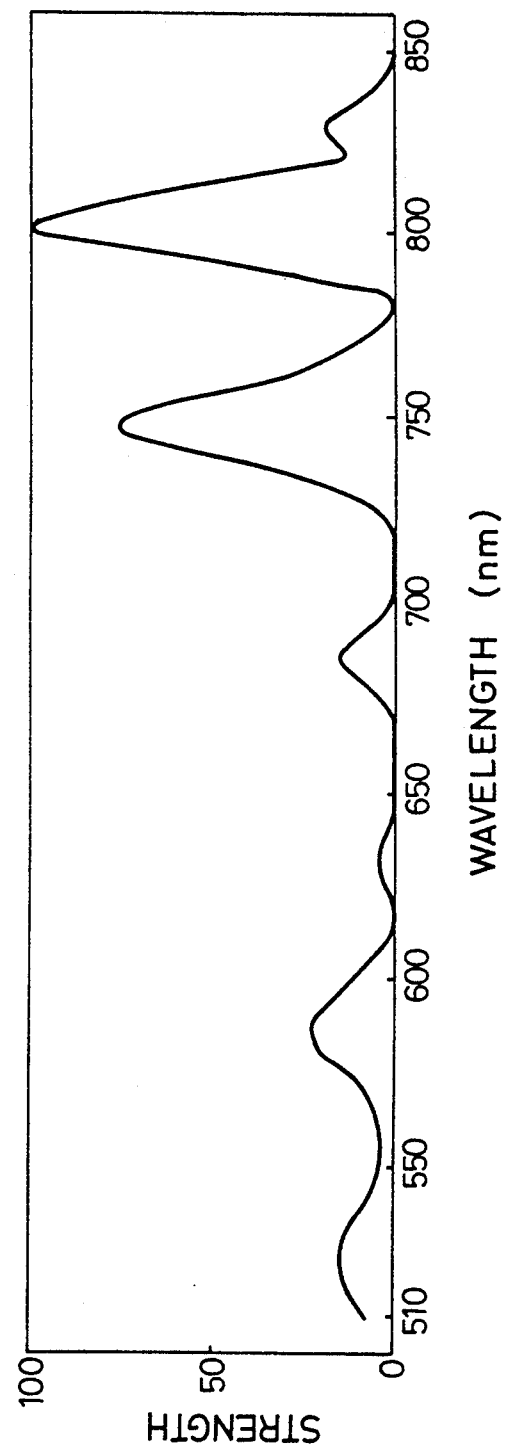
FIG. 1 is a graph showing the results of the measurements of the spectrum of the light which excites the phosphor expressed by $Li(Nd,Yb)P_4O_{12}$.

The spectrum of the light which excited the phosphor expressed by, for example, $Li(Nd,Yb)P_4O_{12}$ was measured. FIG. 1 shows the results of the measurements. As shown in FIG. 1, the spectrum of the light which excited the phosphor expressed by $Li(Nd,Yb)P_4O_{12}$ had peaks near 525 nm, 585 nm, 630 nm, 685 nm, 745 nm, in addition to near 800 nm. These wavelengths represent the spectrum of the light which can excite neodymium ions.

Figure 2:
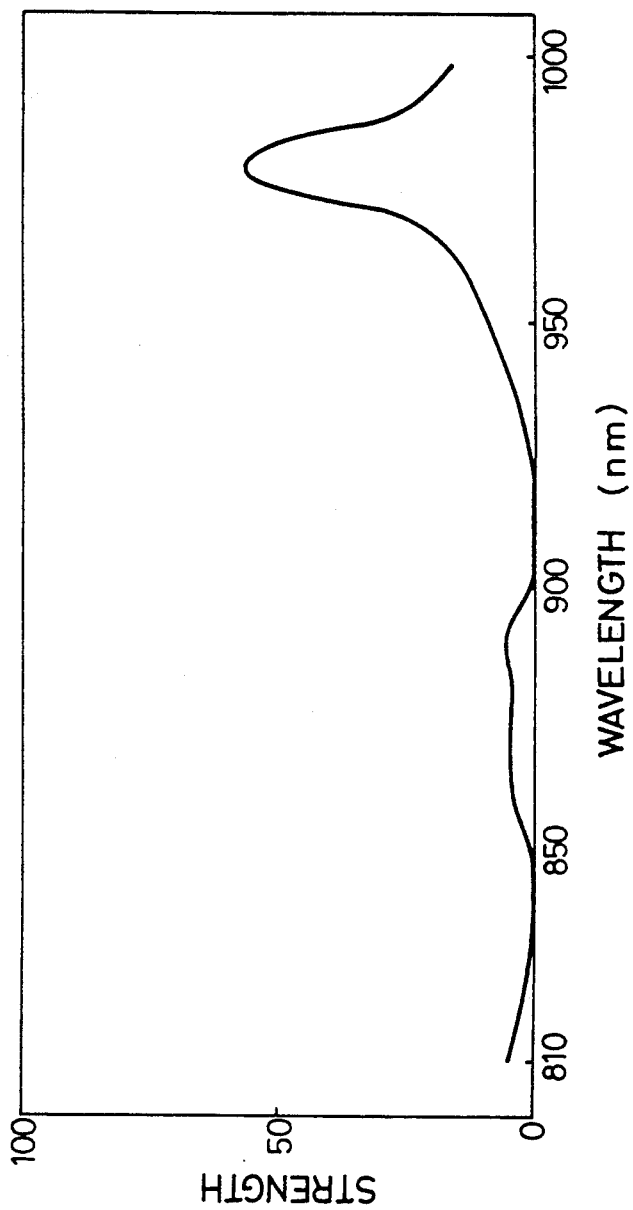
FIG. 2 is a graph showing the peak wavelengths of the light emitted from the phosphor expressed by $Li(Nd,Yb)P_4O_{12}$.

The spectrum of the light emitted from the phosphor expressed by $Li(Nd,Yb)P_4O_{12}$ had a peak near 980 nm, as shown in FIG. 2.

Thus, the information reading method according to the present invention employs light with a wavelength in the range between 500 nm and 780 nm to excite the phosphor. The phosphor emits light having a peak wavelength near 980 nm. This allows a photodetector designed to detect light with wavelengths between 840 nm and 1100 nm to be used alone without using a filter.

The wavelength range of the light used to excite the phosphor is between 500 nm and 780 nm. For example, a light having a wavelength from 500 nm and 550 nm, 550 nm and 650 nm or 650 nm and 780 nm can be used. Particularly, a light having a wavelength from 650 nm and 780 nm is preferred from the viewpoint of the high excitation spectrum intensity.

Information recording phosphor activated by neodymium and ytterbium ions may be phosphate, molybdate or aluminate type compound activated by neodymium and ytterbium ions. Examples of suitable phosphors include $Ca_{10}(PO_4)_6F_2$: Nd, Yb, $Ca_8La_2(PO_4)_6O_2$: Nd, Yb, $YAlO_3$: Nd, Yb, $Y_3Al_5O_{12}$: Nd, Yb, and $Y_3Al_3O_6$: Nd, Yb. In these doping type phosphors, it's preferred to use the phosphors activated by Nb and Yb in the proportion between 1 and 10%.

In addition to those substances, compounds which have been drawing attention recently as the materials of the microminiaturized solid-state laser employing Nd and compounds similar to these compounds can also be used as the phosphor. Examples of such similar compounds include $(Nd, Yb)P_3O_9$: $(Nd, Yb)P_5O_{14}$: $Me(Nd, Yb)P_4O_{12}$ type: $Me_3(Nd, Yb)P_2O_6$ type: $Me(Nd, Yb)(WO_4)_2$ type: $Me_5(Nd, Yb)(WO_4)_4$ type: $Me(Nd, Yb)(MoO_4)_2$ type: $Me_5(Nd, Yb)(MoO_4)_4$ type: $Me_2(Nd, Yb)Mg_2(VO_4)_3$ type: $Al_3(Nd, Yb)(BO_3)_4$: $(Al, Cr)_3(Nd, Yb)(BO_3)_4$: $Me_5(Nd, Yb)(SiO_3)_4$ type: $Me_3(Nd, Yb)Si_2O_7$ type: $Me_3(Nd, Yb)Ge_2O_7$ type: $Me_5(Nd, Yb)(GeO_3)_4$ type: $(Nd, Yb)MgAl_{11}O_{19}$ (in which, Me indicates an alkali metal, such as Na, Li or K): and the aforementioned compounds whose (Nd, Yb) ions are partially substituted by ions that can be trivalent and in which absorption of light of a wavelength between 800 nm and 1000 nm is not present, i.e., by at least one type of ions selected from the group consisting of yttrium (Y), scandium (Sc), lanthanum (La), cerium (Ce), gadolinium (Gd), lutetium (Lu), gallium (Ga), indium (In), antimony (Sb) and bismuth (Bi). In this case, the proportion of Nd and Yb is desirably 5% or above.

The phosphor can be recorded on a predetermined object by various methods. For example, the phosphor can be mixed into the material of that predetermined object during the manufacture thereof (e.g., during the plastic molding process), for example, the phosphor can be mixed into the composition of a plastic which is shaped into a sheet later. Alternatively, a composition containing the phosphor and a binder or a solvent is applied, for example, coated or printed, on a predetermined object as a coating composition, an ink or a paint. In this method, the phosphor may be used in an adequately pulverized form, pulverization method being selected in accordance with the coating or printing method.

Alternatively, an ink composition containing the phosphor is coated on a thin plastic film to manufacture a typing ribbon, and the phosphor is recorded on a predetermined object by performing transferring using that typing ribbon.

The object on which the phosphor is recorded may be made of a plastic, paper, cloth, rubber, metal, a ceramic or glass. Sheets coated with a compound containing magnetic powders and from which information is read out using magnetic codes (such as prepaid cards, credit cards or bank cards) can be used as the recording media by mixing the phosphor into the coating compound.

Examples of suitable plastics include a polyethylene, polypropylene, polycarbonate, vinyl chloride, polystyrene, ABS resin, nylon, an acrylic resin, and a fluororesin.

The information reading method according to the present invention can be applied to various types of information reading apparatus which are generally used in this field, such as the transmission measurement type information reading apparatus, the parallel reflection measurement type information reading apparatus, or 45 degrees reflection measurement type information reading apparatus.

FIG. 3 shows the concept of the information reading apparatus to which the present invention can be applied.

This apparatus is of the transmission measuring type in which a light-emitting device 20 connected to a power source 21 is located on one side of an information carrying body 10 on which information is recorded using a phosphor while a photodetector 30 connected to a tester 31 is placed on the other side of the information carrying body 10. A filter 40 may be provided between the information carrying body 10 and the photodetector 30, although it can be omitted according to the present invention. The tester 31 incorporates an amplifier or the like.

The present invention can also be applied to the parallel reflection measuring type apparatus in which the exciting light and the photodetector 30 are located substantially on the same line relative to the information carrying body on which information is recorded using the phosphor and to the 45 degrees reflection measuring type apparatus in which an exciting light is irradiated on the information carrying body in the direction of 45 degrees and in which the photodetector 30 is located in the direction perpendicular to the direction of the exciting light.

GaAlAs, GaAs or GaP type light-emitting diode can be used as the light source for emitting light with a wavelength between 500 nm and 780 nm to excite the phosphor. A photodetector, employing silicon and designed to detect light with a wavelength between 840 nm and 1100 nm, can be used as the light-receiving device.

As will be understood from the foregoing description, in the present invention, the exciting light to a phosphor activated by neodymium and ytterbium ions has so short wavelength that the information can be read without using the expensive filter by receiving the light emitted from a phosphor, so a device having the complicated structure is not necessary.

Furthermore, since a semiconductor element can be used as a light-emitting or a light-receiving element, the information reading device which carries out the information reading method according to the present invention can be made compact and at the same time reliable.

EXAMPLES

The present invention will now be illustrated in more detail by the following examples.

Example 1

The phosphor expressed by $Li(Nd, Yb)P_4O_{12}$ was used in this example.

To manufacture this phosphor,

| | |
|---|---|
| $Nd_2O_3$ | 30 g |
| $Yb_2O_3$ | 4 g |
| $Li_2Co_3$ | 11 g |
| $(NH_4)H_2PO_4$ | 140 g | were mixed and the mixture was placed in a crucible with a lid made of quartz.

Next, the crucible was placed in an electric furnace, was heated to a temperature of 700° C. from the room temperature over two hours and then fired for two hours at 700° C.

After the crucible was removed from the electric furnace, it was cooled in the air. Thereafter, water was poured into the crucible and the phosphor in the crucible was boiled.

Next, the phosphor was washed first with $1N-HNO_3$ then with water, and was dried.

The sensitivities of the light-receiving elements corresponding to various LED peak wavelengths were measured using the thus-obtained $Li(Nd, Yb)P_4O_{12}$.

The transmission measuring type information reading apparatus shown in FIG. 3 was used in the measurements.

More specifically, a GaAlAs, GaAs or GaP type light-emitting diode which emitted light with a wavelength between 500 nm and 780 nm was used as the light-emitting device 20 to excite the phosphor. A silicon PIN photodiode designed to detect light with a wavelength ranging from 840 nm to 1100 nm was used as the photodetector 30. This photodiode was most sensitive to the light of a wavelength of about 980 nm, emitted from the phosphor. The filter 40 was provided between the sample 10 and the photodetector 30 so as to check the effect of the present invention.

The intensity of light detected by the photodetector was measured using the aforementioned information reading apparatus and a plurality of light-emitting devices 20 which emitted lights with various peak wavelengths under the conditions indicated as follows:
"No Sample"
"Phos"
"Filter"
"Filter+Phos"

"No Sample" indicates the case in which a polyester film was used as the sample 10.

"Phos" indicates the case in which a polyester film coated with the phosphor expressed by Li(Nd, Yb)-$P_4O_{12}$ to a thickness of 100 μm was used as the sample 10.

"Filter" indicates the case in which a polyester film was used as the sample 10 and in which a filter which cut the light in a wavelength of 950 nm or below was used. "Filter+Phos" indicates the case in which a polyester film coated with the phosphor expressed by Li(Nd, Yb)$P_4O_{12}$ to a thickness of 100 μm was used as the sample 10, and in which the filter which cut the light with a wavelength of 950 nm or below was used.

The following table shows the results of the measurements.

| Peak wavelength of the light emitted from LED (nm) | Measuring condition | Current detected by the light-receiving device (A) | Rate of change |
|---|---|---|---|
| 585 | No Sample | $0.26*10^{-7}$ | 4.6 |
|  | Phos | $0.12*10^{-6}$ |  |
|  | Filter | $0.17*10^{-7}$ | 4.7 |
|  | Filter + P | $0.80*10^{-7}$ |  |
| 690 | No Sample | $0.80*10^{-7}$ | 3.3 |
|  | Phos | $0.26*10^{-6}$ |  |
|  | Filter | $0.66*10^{-7}$ | 3.2 |
|  | Filter + P | $0.21*10^{-6}$ |  |
| 700 | No Sample | $0.21*10^{-7}$ | 105 |
|  | Phos | $0.22*10^{-5}$ |  |
|  | Filter | $0.18*10^{-7}$ | 94 |
|  | Filter + P | $0.17*10^{-5}$ |  |
| 800 | No Sample | $0.16*10^{-3}$ | 1.7 |
|  | Phos | $0.27*10^{-3}$ |  |
|  | Filter | $0.20*10^{-4}$ | 4.0 |
|  | Filter + P | $0.80*10^{-4}$ |  |

FIG. 4 shows the wavelengths of the lights emitted from the light-emitting devices used in the measurements and the spectral-response characteristics of the light-receiving device.

In FIG. 4, a curve "A" indicates the spectrum of the light emitted from the LED which peaks at a wavelength of 585 nm, a curve "B" indicates the spectrum of the light emitted from the LED which peaks at a wavelength of 690 nm, a curve "C" indicates the spectrum of the light emitted from the LED which peak at a wavelength of 700 nm, a curve "D" indicates the spectrum of the light emitted from the LED which peaks at a wavelength of 800 nm, and a curve "E" indicates the spectral-response characteristics of the silicon PIN photo diode used in the present invention.

As is clear from the results of the measurements, the spectral sensitivity of the photodetector 30 which detected the light emitted from the phosphor was about five times when the peak wavelength of the light emitted from the LED was 585 nm, about three times when the peak wavelength was 690 nm, and about one hundred times when the peak wavelength was 700 nm, regardless of the provision of the filter 40.

These values vary greatly. For example, when the peak wavelength of the light emitted from the LED was 800 nm, the spectral sensitivity was four times when the filter was used, while it was 1.7 times when no filter was used.

It is apparent from the results of the experiments that the presence or absence of the phosphor can be detected without using the filter 40 by exciting the phosphor using light with a wavelength between 500 nm and 780 nm that can excite neodymium ions and by reading the information by the photodetector 30 designed to detect light with a wavelength between 840 nm and 1100 nm.

Example 2

The parallel reflection measurements and the 45 degrees reflection measurements were performed. In the parallel reflection measurements, the exciting light and the photodetector 30 were located substantially on the same line relative to the polyester film coated with the phosphor expressed by Li(Nd, Yb)$P_4O_{12}$ to 100 μm thick. In the 45 degrees reflection measurements, the light was illuminated on the polyester film coated with the phosphor expressed by Li(Nd, Yb)$P_4O_{12}$ to 100 μm thick in the direction of 45 degrees, and the photodetector 30 was located in the direction perpendicular to the direction of the exciting light. Although actually obtained values differed, substantially the same rates of the spectral sensitivity as those obtained in Example 1 were obtained.

Example 3

Example 3 was performed in the same manner as that of Example 1 except that the phosphor expressed by Li(Nd, Yb)$P_4O_{12}$ used in Example 1 was replaced by a phosphor expressed by $Na_5$(Nd, Yb)$(MoO_4)_4$. Substantially the same rates of the spectral sensitivity as those obtained in Example 1 were obtained.

What is claimed is:

1. An information reading method comprising the steps of:
   irradiating a phosphor activated by neodymium and ytterbium ions with exciting light having a wavelength from 500 nm to 780 nm that can excite the neodymium ions; and
   reading the information by receiving the light emitted from the phosphor with a photodetector sensitive to light within a wavelength range from about 840 nm to about 1100 nm.

2. The information reading method according to claim 1, wherein the exciting light is emitted from a light-emitting element which is a semiconductor element.

3. The information reading method according to claim 1, wherein the wavelength range of the exciting light is from 650 to 780 nm.

4. The information reading method according to claim 1, wherein the wavelength range of the exciting light is from 550 to 650 nm.

5. The information reading method according to claim 1, wherein the wavelength range of the exciting light is from 500 to 550 nm.

6. The information reading method according to claim 1, wherein said phosphor comprises at least one type of compound activated by neodymium and ytterbium ions, said one type of compound being selected from the group consisting of phosphate, molybdate and aluminate type compounds.

7. The information reading method according to claim 6, wherein said phosphor comprises at least one type of phosphor selected from a group consisting of $Me(Nd, Yb)P_4O_{12}$ and $Me_5(Nd, Yb)(MoO_4)$, wherein Me indicates an alkali metal.

8. The information reading method according to claim 1, wherein said phosphor is mixed into a material of a predetermined object during the manufacture of said predetermined object and is thereby recorded on said predetermined object.

9. The information reading method according to claim 1, wherein said phosphor is applied on a predetermined object in the form of a composition containing the phosphor and is thereby recorded on said predetermined object.

10. The information reading method according to claim 9, wherein said composition containing the phosphor is a coating composition.

11. The information reading method according to claim 9, wherein said composition containing the phosphor is an ink.

12. The information reading method according to claim 1, wherein said phosphor is recorded on one type of object made of a material selected from a plastic, paper, rubber, cloth, metal, ceramic, glass and a sheet coated with a compound containing magnetic powders from which information is read out using magnetic codes.

13. An information reading method comprising the steps of:
   irradiating a phosphor activated by neodymium and ytterbium ions with exciting light having peak wavelengths below 780 nm that can excite the neodymium ions; and
   reading the information by receiving the light emitted from the phosphor with a photodetector sensitive to light within a wavelength range from about 840 nm to about 1100 nm.

* * * * *